United States Patent

[11] 3,588,129

| | | |
|---|---|---|
| [72] | Inventor | Alfred Pitner<br>Paris, France |
| [21] | Appl. No. | 739,760 |
| [22] | Filed | June 25, 1968 |
| [45] | Patented | June 28, 1971 |
| [73] | Assignee | Nadella S. A.<br>Paris, France<br>fractional part interest |
| [32] | Priority | June 26, 1967, Jan. 6, 1966 |
| [33] | | France |
| [31] | | 111834 and 44933<br>Continuation-in-part of application Ser. No.<br>605,830, Dec. 29, 1966, now abandoned. |

[54] SEALING DEVICE
17 Claims, 6 Drawing Figs.

[52] U.S. Cl. .................................................. 277/95,
277/205, 277/189, 64/17
[51] Int. Cl. .......................................... F16d 3/26,
F16j 15/04
[50] Field of Search .......................................... 277/82, 95,
25, 133, 178, 182, 183, 189, 84, 133; 308/187.2,
187.1; 64/17 (A)

[56] References Cited
UNITED STATES PATENTS

| | | | |
|---|---|---|---|
| 2,773,367 | 12/1956 | Slaght.......................... | 277/205X |
| 3,016,251 | 1/1962 | Gilbert......................... | 277/133X |
| 3,457,732 | 7/1969 | Decouzon .................... | 64/17 |

Primary Examiner—Samuel B. Rothberg
Attorneys—Robert E. Burns and Emmanuel J. Lobato ABSTRACT: A sealing device, adapted to be disposed between a bearing and a journal which is disposed in the bearing and has a shoulder, comprises an elastomer V-section ring having two lips applied respectively in contact with the bearing and the journal shoulder and a protecting element encompassing and centered by the ring. The protecting element comprises a relatively rigid annular element which is centered relative to the ring and includes an annular wall which protects at least one of the lips of the ring. Preferably the protecting element has a stiffening rib extending radially between the lips and a skirt portion which extends axially from the rib and overlaps the adjacent end of the bearing.

PATENTED JUN28 1971
SHEET 1 OF 2
3,588,129
PRIOR ART
Fig.1
Fig.2
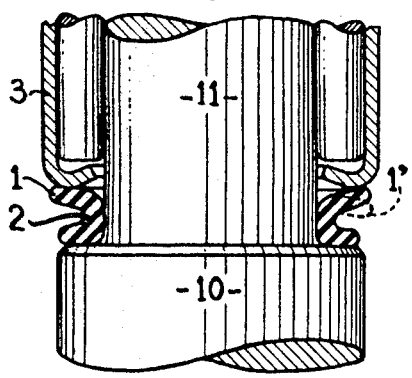
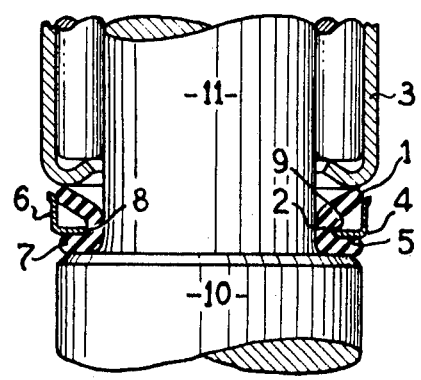
Fig.3
Fig.4
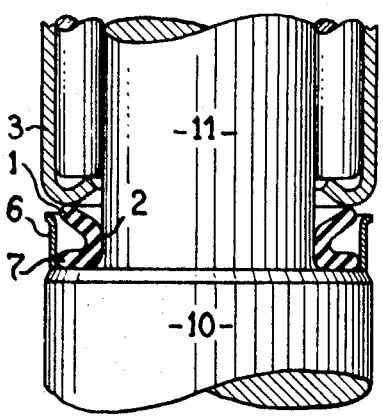
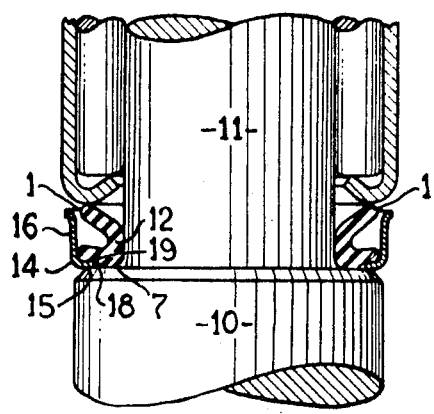
Fig.5
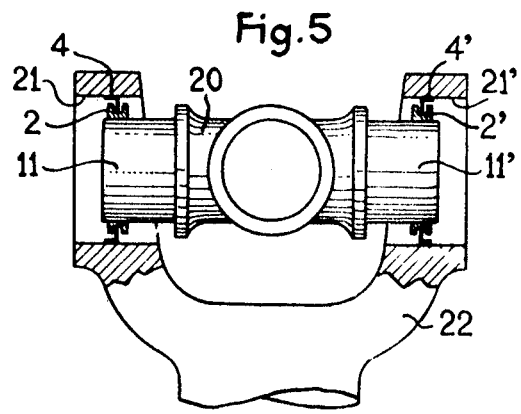

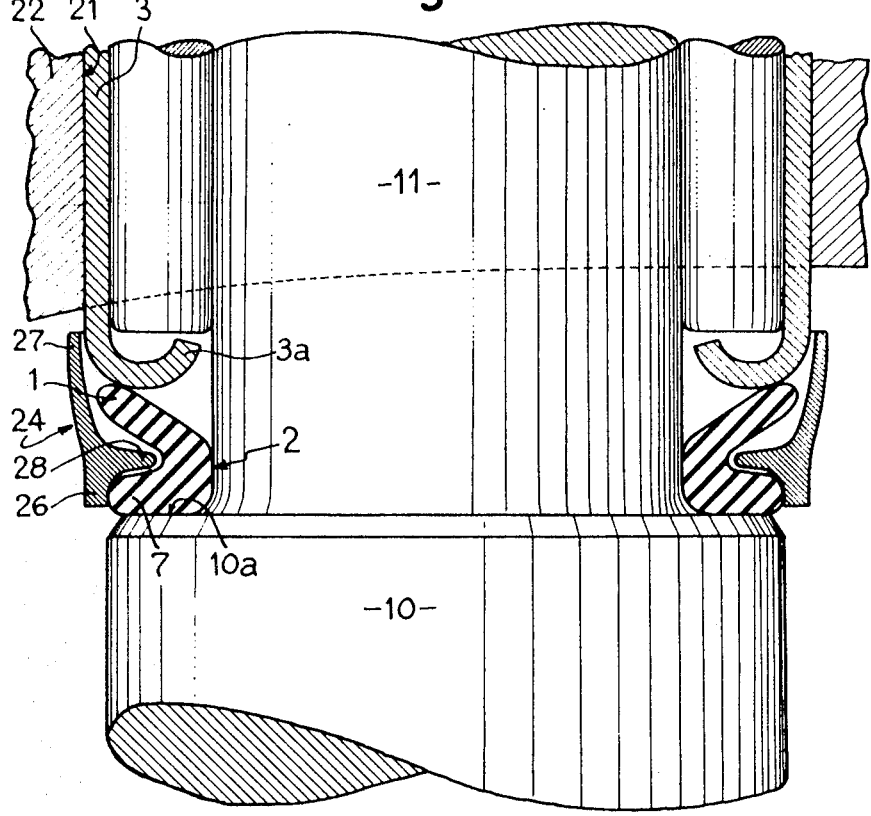

SEALING DEVICE

This application is a continuation-in-part of my application Ser. No. 605,830 filed Dec. 29, 1966, abandoned on Oct. 14, 1968.

The present invention relates to the use, as sealing means, of a ring of an elastomer material which is a tight fit on the outer surface of a shaft, or more particularly of a journal, and clamped axially between a lateral face of a bearing surrounding the journal and a shoulder integral with the latter.

This is the case, for example, in assemblies employed in universal joint devices of the cardan type in which the four branches of the crossmember constituting journals are mounted, by means of four bearings having rolling elements or antifriction bushings, in supports termed jaws which are rigid with rotary shafts and are adapted to transmit the motion from one of said shafts to the other.

For the purpose of sealing such an assembly it is known, for example from French Pat. Nos. 1,217,643 & 1,228,019 to dispose around the journal and between the two faces, constituted by the end of the bearing and by a shoulder integral with the journal, a ring of elastomer material the arrangement of which ensures a contact under stress in three zones so as to afford a very effective seal.

In said patents the ring has an "O" or like section and does not have sufficient elasticity in an axial direction and in practice, in order to take into account the addition of the tolerances of the various parts in the axial direction, this seal is arranged in the form of an annular ring having a V-section, such as that shown in FIG. 1 of this application. Although this seal is very effective in mass-produced assemblies with relatively high tolerances in an axial direction of the journal, the disadvantage of this system is that the lip 1 (FIG. 1) is exposed to the action of violent projections of solids, such as gravel or liquids, for example high-pressure water employed for washing, in particular for removing from the underside of the vehicle deposits of the salt usually employed for melting snow on highways.

In the case of projections of solids and depending on the nature of the elastometer employed in the sealing ring, the edge of this ring is liable to be torn and there is a possibility of the seal being destroyed owing to the spreading of the tear.

In the second case, the direct projection of a violent jet of water on the edge of this lip can fold it back and create an opening through which the water can enter. This water contains varying amounts of foreign bodies which are liable to result in a slow internal destruction of the bearing.

In order to overcome these various drawbacks it has usually been proposed to employ a rigid metal L-section ring one of the flanges of which surrounds the sealing ring whereas the other flange is interposed between the shoulder and the ring. This system has the drawback of diminishing the effectiveness of the sealing ring by replacing one or two of the zones of elastomer to metal close contact mentioned herein before by zones of metal to metal contact in which the contact is insufficiently close, the surface conditions being unsuitable for creating a true seal. Thus, although preservation of the sealing ring is improved, experience has shown that the overall efficiency is less than in the simple system of a single ring of elastomer.

An object of the present invention is to provide a simple and cheap sealing device whereby it is possible to maintain the aforementioned qualities of the known device having a single ring of elastomer while achieving an effective protection of the lips by opposing an undesirable deformation of the latter.

The invention provides a device which conserves the above-mentioned three zones of contact and in which the ring of elastomer is combined with a relatively rigid annular element which is centered relative to the ring and the section of which comprises an annular wall which protects at least one of the lips of the ring.

Thus the lip adjacent the bearing can be protected. Further, depending on the dimensions of the parts and according to the present invention, this lip can be supported by bearing against the annular wall of the annular element after having elastically assumed the shape which would ensure a contact with the edge of the bearing. While being effectively supported, this lip, owing to the elastic support, can assume any position necessary for accommodating tolerances in the spacing between the bearing and the shoulder of the journal, these tolerances usually being a few tenths of a millimetre.

The annular element advantageously has a radial lip or flange. In this case, the bearing of the lip adjacent the bearing on the annular wall contributes to the effectiveness of the seal afforded by the ring, since it is manifested by a downward thrust on the flange which tends to compress still further the lower lip in contact with the shoulder.

In a preferred form, the protecting element comprises an annular sleeve element having a stiffening and positioning rib which projects radially inwardly intermediate the ends of the sleeve and is received in the V of the sealing ring.

In the application of the device to the sealing of a universal joint, the invention also affords the advantage of permitting a temporary centering of the journal relative to the bore of the jaw if the assembly comprising the ring and the annular element is initially given a suitable axial position (which could be different from the final position). This possibility facilitates the assembly of the bearing interposed between each bore of the jaw and the corresponding journal of the crossmember and consequently results in simplification in the tooling necessary for this assembly, or possibly in the elimination of certain of the successive operations leading to the final assembly of the universal joint, such as those described in the U.S. Pat. No. 3,290,754.

Further features and advantages of the invention will be apparent from the ensuing description with reference to the accompanying drawing.

In the drawing:

FIG. 1 is a view of a device having a sealing ring of conventional type;

FIG. 2 is a view of an annular V-section sealing ring which is combined with a rigid annular element for protecting the ring;

FIG. 3 is a similar view of a modification of the device shown in FIG. 2;

FIG. 4 is a similar view of another modification;

FIG. 5 is an elevational view of a universal joint crossmember centered in the bores of a universal joint jaw by means of an assembly of a sealing ring and annular element; and FIG. 6 is a side view, partially in radial section, of another sealing device in accordance with the invention.

FIG. 1 shows a conventional assembly in which a lip 1 of a sealing ring 2 is in contact with a bearing 3. It will be understood that, bearing in mind the low pressure of application of the lip 1 against the bearing, a relatively violent downwardly directed jet of water might bend or deform this lip to the position 1' shown in dotted line and thus allow the liquid to enter the bearing.

In FIG. 2 the ring 2 is completed by an annular element 4 of metal or moulded plastics material having for example an L-shaped section and including a flange 5 and a cylindrical or slightly conical annular wall 6. The element 4 is mounted to more or less float in the axial direction between the lips 1 and 7 of the ring 2. This presents no inconvenience since the element performs no sealing function by contact, on the contrary, it affords the advantage of allowing the ring 2 freedom as concerns its axial elasticity. On the other hand, this element 4 is substantially centered owing to contact at least three points between the inner edge 8 of the flange 5 and the periphery 9 of the ring 2. Depending on the compressed position of the elastic ring 2, the annular wall 6 of the element 4 can be more or less remote from the edge of the lip 1. As mentioned hereinbefore, this presents no inconvenience in view of the function of the element and has the advantage of providing freedom for the ring. However, an embodiment is shown in which this freedom is nil or negative in one position or in all positions so as to render the lip 1 somewhat rigid and support it or constrain it so as to ensure its contact with the end of the bearing.

Further, it must be made clear that the annular element 4, although termed "rigid" relative to the elastomer ring, can have a certain deformability in particular when constructed of plastics material so as to distribute the stresses on the ring 2 resulting from the aforementioned radial and axial contacts.

Although, it is not directly covered by the annular element 4, the lip 7 is in fact protected from projections of solid bodies by a setback position relative to the shoulder 10 of the journal 11 and relative to the cylindrical wall 6 of the annular element 4. It is also nondeformable by a relatively powerful jet of liquid owing to the incidence at which the action of the jet can act and the only slight deformability of this lip owing to its shape and disposition.

In FIG. 3, the flange 5 of the element 4 has been eliminated and the annular wall 6—which can be stiffened if desired by a median rib—extends substantially over the entire height of the ring 2. The annular element is centered relative to the ring by contact with the end of the lip 7 and held axially in position approximately possibly by the tight fit on the lip 7 and limitation of the upward displacement thereof by the sleeve or cup 3 and downward displacement by the shoulder 10.

In FIG. 4, a sealing ring 12 is employed which has a shape generally similar to the ring 2 mentioned hereinbefore but includes a recess 19 whose function is the same as that of the face 9 of the ring 2, namely for substantially centering the edge 18 of the flange 15, the latter having a limited radial extent. This modification has the advantage of allowing an easier assembly of the ring 12 and annular element 14 and effectively protects the second lip 7 of the ring. However, it should be mentioned that this arrangement does not allow before assembly interconnecting the annular element and the elastic ring and this might give rise to some difficulty in the assembly of the parts comprising such a sealing device.

FIG. 5 shows a universal joint crossmember 20 having four journals, such as the two journals 11 and 11' each of which is provided with an elastic sealing ring 2 or 2' combined with an L-section annular element 4 or 4'. The crossmember 20 is shown after it has been placed in position subsequent to a tilting thereof, according to the usual practice, inside the bores 21 and 21' of the universal joint jaw 22.

It will be observed that the common axis of the journal 11 and 11' is roughly coincident with the axis of the bores 21 and 22' owing to the contact of the annular walls 6 and 6' of the elements 4 and 4' in the bores 21 and 21' and also to the centering achieved by the periphery 9 of the ring 2 in contact with the edge 8 of the flange 5. This arrangement greatly facilitates the assembly of the cups 3 by a simple press operation, without auxiliary tooling, for achieving a relative centering between the crossmember 20 and the jaw 22. Further, with reference to the device for assembling needle bearings for a universal joint such as that described in the French Pat. No. 1,246,908 and its first addition and U.S. Pat. No. 3,062,026, and to the apparatus for assembling universal joints described in U.S. Pat. No. 3,290,754, owing to the elimination of the aforementioned auxiliary tooling, it is no longer necessary to provide two separate operations one of which is a preassembly operation consisting in putting the needle cups in position and the other a final fixing operation for fixing said needle cups in the bores of the jaw, it being possible to combine these operations easily by pushing into position, by means of two opposed presses operating simultaneously on the both sides of the jaw, the two needle cups and their retaining means. This results in an appreciable reduction in the time taken to carry out the operations.

FIG. 6 shows a device according to the invention which affords a seal between the cup of a needle bearing, fitted in the bore 21 of a jaw of a universal joint 22, and the crossmember 10 of the universal joint the journal 11 of which is capped by the cap 3.

The ring 2 of elastomer has an intermediate annular portion which radially grips the outer face of the journal 11 and the lips 1 and 7 thereof are axially gripped between the edge or flange 3a of the cup 3 and the shoulder 10a which defines the start of the journal 11. This ring is protected by a semirigid annular element 24. The latter is, for example, of a plastics material and centered relative to the flexible ring 2 by a cylindrical portion 26 which surrounds and radially grips the lip 7 of the ring and has an outside diameter slightly less than the inside diameter of the bore 21.

The cylindrical portion 26 is axially extended by a skirt portion 27 which is slightly flared upwardly and whose upper portion overlaps for a certain distance the lower end of the cup 3 and thus completely protects the upper lip 1 of the ring 2.

The skirt portion 27 is sufficiently thin to be radially deformable so that the protecting element 24 benefits from the guiding action of the cylindrical portion 26, centered on the ring 2, in passing inside the bore 21 and taking up its position around the journal 11 in abutting relation to the shoulder 10a before the cup 3 is mounted on the journal 11.

The element 24 is however stiffened by a radial rib 28 which is formed at the junction point of the skirt portion 27 and the cylindrical portion 26 and extends into the triangular space between the two lips 1 and 7.

The radial rib 28 ensures that the element 24 behaves well in the axial direction by preventing contact between the skirt portion 27 and the jaw 22 which could otherwise destroy this skirt portion, and, moreover, has for result that the shoulder 10a does not perform the function of an abutment so that the diameter of this shoulder can be reduced, as shown, to the diameter of the lip 7, which facilitates the introduction of the journal of the crossmember 11 inside the jaw 22 by a tilting of this crossmember.

The radial rib 28 can also, by the bearing of its edge in the bottom of the groove between the lips 1 and 7, center the protecting element 24 instead of this being effected by the contact between the cylindrical portion 26 and the lip 7.

It will be observed that the assembly of the device is simple since it comprises a subassembly consisting of the ring of elastomer 2 and the protecting element 24, which can be produced on an automatic machine, this subassembly being mounted in a single operation on the journal when assembling the universal joint.

In application of the sealing device to universal joints, the bearing is fitted in a bore of the corresponding jaw and, owing to the manner of assembling the universal joint, the V-shaped ring and the annular protecting element must be placed in position via the bore before this fitting. Consequently, the skirt portion which is intended to cover the end of the bearing and therefore has a diameter exceeding the outside diameter of the bearing, must be deformable inside the bore. This deformability, produced by a suitable choice of the material and of the thickness of the wall, does not effect the capacity of the annular element to center the journal in the bore in the course of the assembling operations described in the main patent, owing to the presence of the radial stiffening rib and of the relative centering between the lip of the ring of elastomer which bears against the shoulder of the journal and the adjacent annular edge of the annular protecting element.

Although a specific embodiment of the invention has been described, many modifications and changes may be made therein without departing from the scope of the invention as defined in the appended claims.

I claim:

1. A sealing device for a bearing mounted on a shaft, comprising a ring of elastomer having a section approximately in the shape of a V defining two annular lips, said ring having three zones of contact with respectively said shaft and two lateral faces respectively on a bearing in which said shaft rotates and on a shoulder integral with said shaft, and a relatively rigid annular element which is combined with said ring so as to be centered by said ring and comprises an annular wall which protects at least one of said lips of the ring.

2. A device as claimed in claim 1, wherein the annular element comprises a radially extending flange or rib.

3. A device as claimed in claim 2, wherein the flange centers the annular element with respect to the ring.

4. A device as claimed in claim 3, wherein the inner shape of the flange and the outer shape of the ring in the region of the corresponding radial section are such that the contact therebetween occurs at points or on limited segments.

5. A device as claimed in claim 1, wherein at least one of the lips of the ring of elastometer is free to move relative to the annular wall.

6. A device as claimed in claim 1, wherein at least one of the lips of the ring of elastomer is radially compressed by the annular wall.

7. A device as claimed in claim 1, wherein the flange of the annular element is located between the branches of the V-shaped section so as to reduce the possibility of relative axial movement between the ring and the element.

8. A device as claimed in claim 7, wherein the dimensions are such that one of the lips bears against the annular wall so that the flange of the annular element tends to compress axially the other lip.

9. A device as claimed in claim 1, wherein the axial movements of the annular element are limited by abutment with the lateral faces of the bearing and shoulder.

10. A device as claimed in claim 1, wherein the annular element is deformable to a certain extent so as to cooperate with the ring.

11. A device as claimed in claim 1, wherein the dimensions of the annular wall as concerns diameter and length are such that after said assembly comprising the ring and the annular element has been placed in appropriate position on the shaft and after introduction of the shaft in a receiving bore, said assembly creates a relative centering so as to permit an easy introduction of the bearing interposed between the shaft and the bore.

12. A sealing device adapted to be disposed between a bearing and a journal which rotates in the bearing and has a shoulder, said sealing device comprising a ring of elastomer having a V-section defining an annular intermediate portion and two annular outer lips which extend from said intermediate portion and are adapted to be applied in contact respectively with the bearing and said shoulder, said intermediate portion being in contact with said journal, a relatively rigid annular protecting element engaged on and centered by and encompassing the ring for protecting the ring, said annular element being in spaced relation to said journal and comprising a stiffening rib extending radially inwardly between said lips of the ring, and a skirt portion which extends axially from said rib and overlaps the adjacent end of the bearing.

13. A device as claimed in claim 12, wherein said skirt portion has a flared shape.

14. A device as claimed in claim 12, wherein said skirt portion is elastically deformable whereby the protecting element can pass through the bore in which the bearing is fitted before the bearing is placed in position.

15. A device as claimed in claim 12, wherein said lips define a groove and said rib bears against the inner end of the groove and thus centers the annular element.

16. A device as claimed in claim 12, wherein the annular element comprises an annular wall portion axially remote from said skirt portion and encompassing and in contact with the lip in contact with said shoulder whereby said annular element is centered by said ring.

17. A device as claimed in claim 12, wherein the rib retains the annular element axially in both directions, and said element is in spaced relation to said bearing.

UNITED STATES PATENT OFFICE
CERTIFICATE OF CORRECTION

Patent No. 3,588,129     Dated June 28, 1971

Inventor(s) ALFRED PITNER

It is certified that error appears in the above-identified patent and that said Letters Patent are hereby corrected as shown below:

In the heading to the Patent change item "[73] Assignee"

to read as follows:

--[73] Assignee   NADELLA S.A.
                  RUEIL-MALMAISON, FRANCE
                  Undivided one-half interest--

Signed and sealed this 23rd day of April 1974.

(SEAL)
Attest:

EDWARD M. FLETCHER, JR.
Attesting Officer

C. MARSHALL DANN
Commissioner of Patents

FORM PO-1050 (10-69)